April 29, 1958  D. R. McCOY  2,832,915
ALARM SYSTEM RESPONSIVE TO SONIC VIBRATIONS
Original Filed Feb. 3, 1950
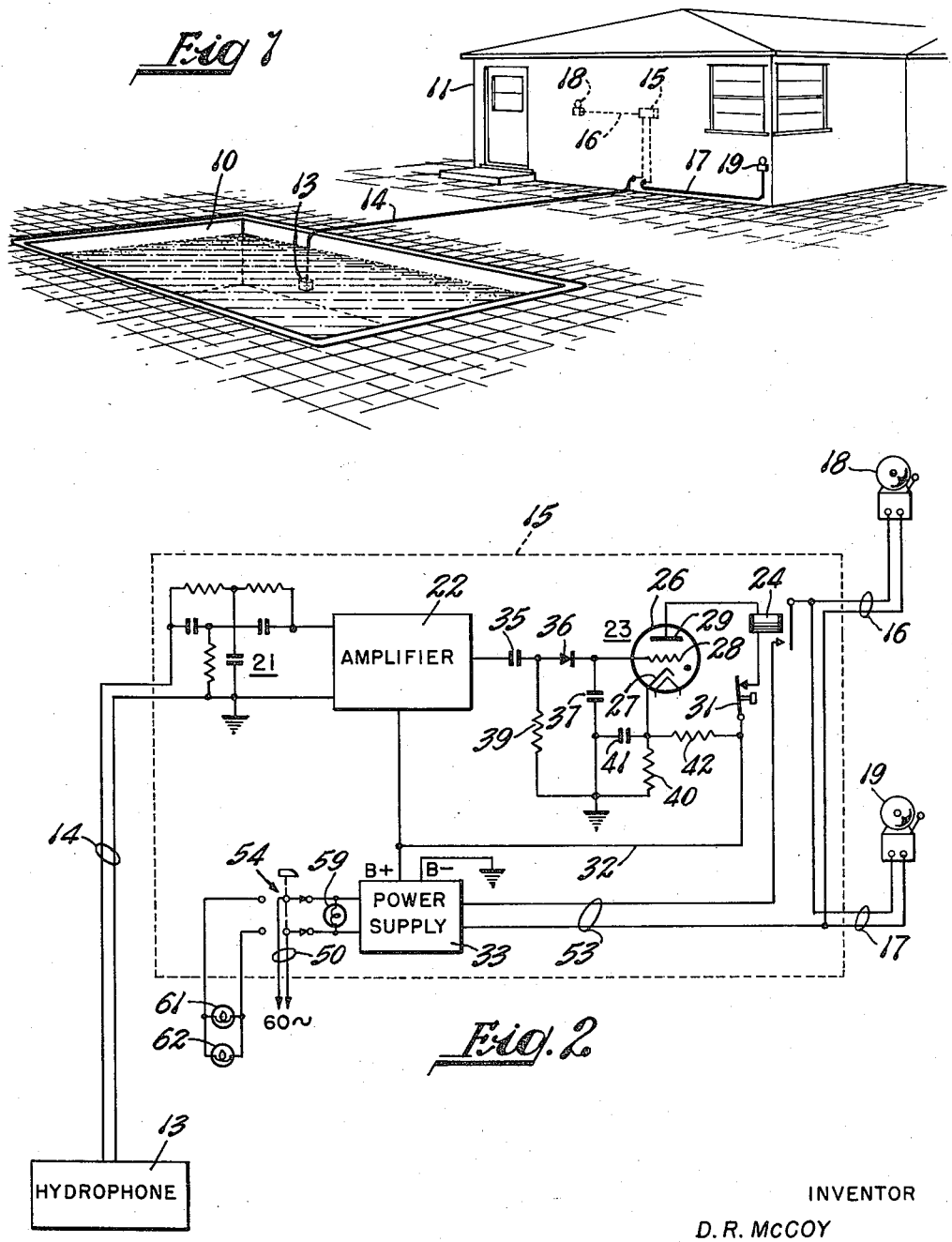
INVENTOR
D. R. McCOY
BY
ATTORNEY

United States Patent Office 2,832,915
Patented Apr. 29, 1958

2,832,915
ALARM SYSTEM RESPONSIVE TO SONIC VIBRATIONS

Donald R. McCoy, North Hollywood, Calif., assignor to Bendix Aviation Corporation, North Hollywood, Calif., a corporation of Delaware Original application February 3, 1950, Serial No. 142,248. Divided and this application September 14, 1953, Serial No. 379,806

5 Claims. (Cl. 315—168)

This invention relates to alarm systems sensitive to sonic vibrations, and has application to the protection of bodies of water, such as unattended swimming pools, fish ponds, and the like, for indicating the falling of a body into the water. It is useful as a lifesaving device to protect people who accidentally fall into such bodies of water, and is also useful to indicate trespassing.

This application is a division of application Serial No. 142,248, filed February 3, 1950, in the names of Donald M. McCoy and Justus M. D. R. Armstrong.

A broad object of the invention is to provide a sensitive and reliable system for indicating the presence of sonic waves.

Another object is to provide a practicable alarm or indicating system capable of responding to the disturbance of water produced by a foreign body falling into it.

Another object is to provide an indicating system for protecting a swimming pool or the like that can be substantially concealed and can be completely controlled at a point remote from the body of water that is protected.

It has heretofore been proposed to produce an alarm in response to the falling of an object into the water by a switch device floating on the water that closed an alarm circuit when agitated by surface waves. Such devices have the disadvantage that they are readily visible and invite tampering by curious people, and that they must be manually reset after each operation.

The present invention is based on a different approach to the problem. Instead of utilizing the surface waves, it utilizes the pressure or sonic waves that are transmitted through the water from the point of impact therewith of the foreign body. These pressure waves are picked up and converted into electrical waves by a transducer or hydrophone that is submerged in the water so that it is concealed, or at least is inconspicuous and thereby not subject to tampering. The electrical waves are conducted by a suitable transmission line to a control box containing an amplifier and a detector, the control box being located at any convenient point. In normal use the hydrophone need not be accessible, the reset operation being performed at the control box.

The electrical system of the invention includes certain novel features that are desirable, if not essential, to reliable operation, since they reduce the possibility of false alarms by extraneous potentials, as distinct from potentials originating in the hydrophone. These features include an exclusion filter for excluding from the amplifier stray alternating current potentials induced by commercial electrical power lines in the vicinity, and a detector circuit that is immune to transient circuits developed by the reset switching operation. This latter feature may have general application to various trip circuits in addition to its application to a sonic wave detection circuit.

The manner in which the aforementioned objects of the invention are achieved, together with various other features of the invention, will appear from the description to follow with reference to the drawing, in which:

Fig. 1 is a perspective view of a system in accordance with the invention applied to the protection of a swimming pool; and Fig. 2 is a schematic diagram showing the electrical circuit involved in the system of Fig. 1.

Referring first to Fig. 1, there is disclosed a swimming pool 10 located a short distance from a building 11. The protective system in accordance with the invention comprises a hydrophone 13 that is submerged in the water of the pool 10 and is connected by an electrical cable 14 to a control box 15 located in the building 11. The control box 15 has connected thereto, by connecting lines 16 and 17 respectively, an alarm bell 18 located within the building 11, and an alarm bell 19 located exteriorly of the building. These alarm bells 18 and 19 may, of course, be located at any desirable point, depending upon the particular circumstances.

The hydrophone 13 responds to sonic vibrations in the pool 10 to produce electrical waves of corresponding frequency which are transmitted through the cable 14 to the control box 15 where they are amplified, detected, and cause to close a relay that completes an energizing circuit to the alarm bells 18 and 19. The electrical circuit will now be described with reference to the circuit diagram of Fig. 2, in which parts corresponding to those in Fig. 1 bear the same reference numbers.

Referring to Fig. 2, the hydrophone 13 may be of any known type, such as a crystal or magnetic pick-up. It should be capable of handling a relatively wide range of frequencies since the pressure waves produced in the water by objects falling thereinto are not confined to any particular frequency range. They may fall within the audible range, or they may extend into the supersonic range. The hydrophone 13 converts these sonic vibrations into alternating electrical currents or electrical waves of corresponding frequencies which are transmitted over the cable 14. Since the electrical waves may sometimes be relatively weak, it is desirable to shield the wires conducting them from stray potentials, and if the cable 14 is of appreciable length it should be shielded and may be of the coaxial conductor type.

At the control box 15 the electrical waves transmitted over the cable 14 pass through a filter 21 into an amplifier 22, which amplifier is preferably of the vacuum tube type that builds the relatively weak waves received over the cable 14 up to a substantial amplitude. The amplified waves are then detected in a detection circuit 23 and caused to energize a relay 24 which closes a circuit to the alarm bells 18 and 19.

The filter 21 is of a conventional known type which has a high attenuation for the particular frequency to which it is tuned, while having a relatively low attenuation for all frequencies both above and below the tuned frequency. The particular filter shown is of the RC type known as a twin T network which is relatively inexpensive. This filter 21 is tuned to the frequency of the commercial power supply in the neighborhood, which is usually 60 cycles per second. The filter may not always be necessary, but it is frequently found that stray potentials will be induced in the hydrophone 13 or in the cable 14 that may be of substantial magnitude compared to the signal currents generated by the hydrophone. By virtue of the fact that the filter 21 is tuned to the power frequency, it excludes extraneous currents of that frequency without materially reducing the energy content of the waves produced by the hydrophone 13 in response to a shock in the water.

The detector circuit 23 comprises a thyratron tube 26 having a cathode 27, control grid 28 and anode 29, and containing a gas that ionizes to produce a relatively large current flow. It is a well-known characteristic of such tubes that with a positive potential on the anode 29, the tube can be maintained in non-conducting condition by a relatively low negative potential on the grid 28, but after a discharge has once been started by driving the grid 28 sufficiently positive, the discharge cannot be readily stopped by the impression of a negative charge on the grid. Hence after the tube has been fired by the application to its grid of a suitable potential, it is usually extinguished by opening the anode circuit (where, as in this instance, the anode is energized with direct current). As shown, the anode 29 is connected through the relay 24 and a normally closed push button switch 31 with the positive lead 32 of a power pack 33. The anode circuit is opened to extinguish the tube by momentarily actuating the push button switch 31.

The amplified waves from the amplifier 22 are applied through a condenser 35 and a rectifier 36 to the grid 28, the rectifier 36 passing the positive half waves and blocking the negative half waves, to drive the grid 28 positive. A small condenser 37 is connected between the grid 28 and ground to maintain the positive potential on the grid between pulses.

To make possible the application of a biasing potential to the grid 28, the rectifier 36 is of a type having a high but finite reverse resistance, so that when the amplifier 22 is not applying positive pulses through the rectifier 36, a negative charge on the grid 28 can leak off through the rectifier 36 and through a grid leak resistor 39 to ground. The cathode 27 is connected to ground through a biasing resistor 40 which is bridged by a relatively large condenser 41. A bleed resistor 42 is connected between the positive lead 32 from the power supply and the cathode 27 to provide a constant minimum current through the biasing resistor 40 at all times that is sufficient to negatively bias the grid 28 slightly beyond the potential at which the tube 26 fires. After the tube has fired, the current flowing through the biasing resistor 40 from the bleed resistor 42 is augmented by the cathode current of tube 26 which may be substantially greater. Hence, after the tube has fired, the biasing potential on the grid 28 is made substantially more negative for the purpose of increasing the immunity of the tube to reignition when the push button 31 is opened and closed.

Of course when the switch 31 is opened, the cathode current is immediately broken, but the relatively large condenser 41 thereafter discharges through the resistor 40 and maintains a substantial potential thereacross for the brief interval that the switch 31 is open. Hence when the switch 31 recloses to again apply the anode potential to the anode 29, the high negative bias is still being maintained on the grid 28 so that it will not respond to any transient potential that might be applied to it. Such a transient potential could result from the opening or closing of the switch 31, since a relatively slight transient produced in an early stage of the amplifier 22 could be built up to a substantial magnitude in the output of the amplifier.

The power supply 33, as shown, is of a conventional type adapted to be connected to an ordinary 115-volt lighting circuit 50. It supplies the usual high potential to the conductor 32 which delivers it to the anode 29 of the tube 26 and to the amplifier 22. It also supplies a low potential over conductor 53 to energize the bells 18 and 19 and the cathode heaters of the tube 26 and the tubes in the amplifier 22. A pilot lamp 59 indicates when the system is energized for operation.

The power pack 33 is preferably connected to the energizing line 50 through a snap action double-throw switch 54 which in one position connects the power main 50 to the power pack, and in the other position energizes one or more signal lamps 61 and 62 which may be suitably located as a warning that the protective system is not in operation.

Although for the purpose of explaining the invention, a particular embodiment thereof has been shown and described, obvious modifications will occur to a person skilled in the art, and I do not desire to be limited to the exact details shown and described.

I claim:

1. An alarm circuit for producing an alarm in response to electrical waves of predetermined magnitude comprising: an input terminal to which said electrical waves are applied; an electronic tube of the gas discharge type having a cathode, control grid and anode; a source of direct anode potential having positive and negative terminals; load means and switch means in series connecting said positive terminal to said anode; a cathode resistor connecting said negative terminal to said cathode; means forming a grid biasing path between said control grid and said negative terminal; means for applying positive pulses from said input terminal to said grid; said cathode resistor being of such magnitude as to develop a negative biasing potential on said grid exceeding said positive pulses from said input terminal when said tube is conducting current; and a condenser bridging said cathode resistor and maintaining flow of biasing current therethrough during momentary opening and closing of said switch means, whereby said tube is temporarily rendered abnormally insensitive at the time of reclosure of said switching means.

2. Apparatus according to claim 1 including means for maintaining a bias on said grid independent of the cathode current, and of such magnitude as to render said tube normally non-conductive but rendering it conductive in response to said positive pulses from said input terminal.

3. Apparatus according to claim 2 in which said means for applying positive pulses from said input terminal to said grid includes a rectifier in series between said input terminal and said grid, said rectifier having a high but finite inverse resistance; and said grid biasing path comprising a leak resistor in series with said rectifier between said grid and said negative terminal.

4. In combination, an electronic tube of the gas discharge type having a cathode, anode and control grid, a source of anode potential having positive and negative terminals; means including a switch connecting said positive terminal to said anode; a cathode biasing resistor connecting said cathode to the negative terminal of said anode supply for producing a potential drop in response to flow of cathode current therethrough; means for applying a triggering potential to said grid to institute a discharge in said tube; and a condenser of substantial capacity in shunt to said cathode resistor for maintaining said potential drop thereacross during momentary opening of said switch.

5. Apparatus according to claim 4 including a source of waves for energizing said grid; and a half wave rectifier connected between said source and said grid and poled to apply positive pulses to said grid; and means completing a direct current path from said negative terminal anode supply through said rectifier to said grid, said rectifier having a high but finite inverse resistance.

References Cited in the file of this patent
UNITED STATES PATENTS

| | | |
|---|---|---|
| 2,275,027 | Bell | Mar. 3, 1942 |
| 2,288,554 | Smith | June 30, 1942 |
| 2,310,105 | Michel | Feb. 2, 1943 |
| 2,398,432 | Livermore | Apr. 16, 1946 |
| 2,428,290 | Peck | Sept. 30, 1947 |
| 2,441,677 | Stallsmith | May 18, 1948 |
| 2,442,430 | O'Brien | June 1, 1948 |
| 2,457,125 | Chatterjea et al. | Dec. 28, 1948 |
| 2,457,176 | Preisman | Dec. 28, 1948 |
| 2,462,945 | Carlson | Mar. 1, 1949 |
| 2,470,303 | Greenough | May 17, 1949 |
| 2,509,345 | Howell et al. | May 30, 1950 |
| 2,607,023 | Coughlin | Aug. 12, 1952 |